Dec. 27, 1966    J. B. SIMMS    3,293,727
CUTTING TOOL
Filed April 12, 1961    2 Sheets-Sheet 1
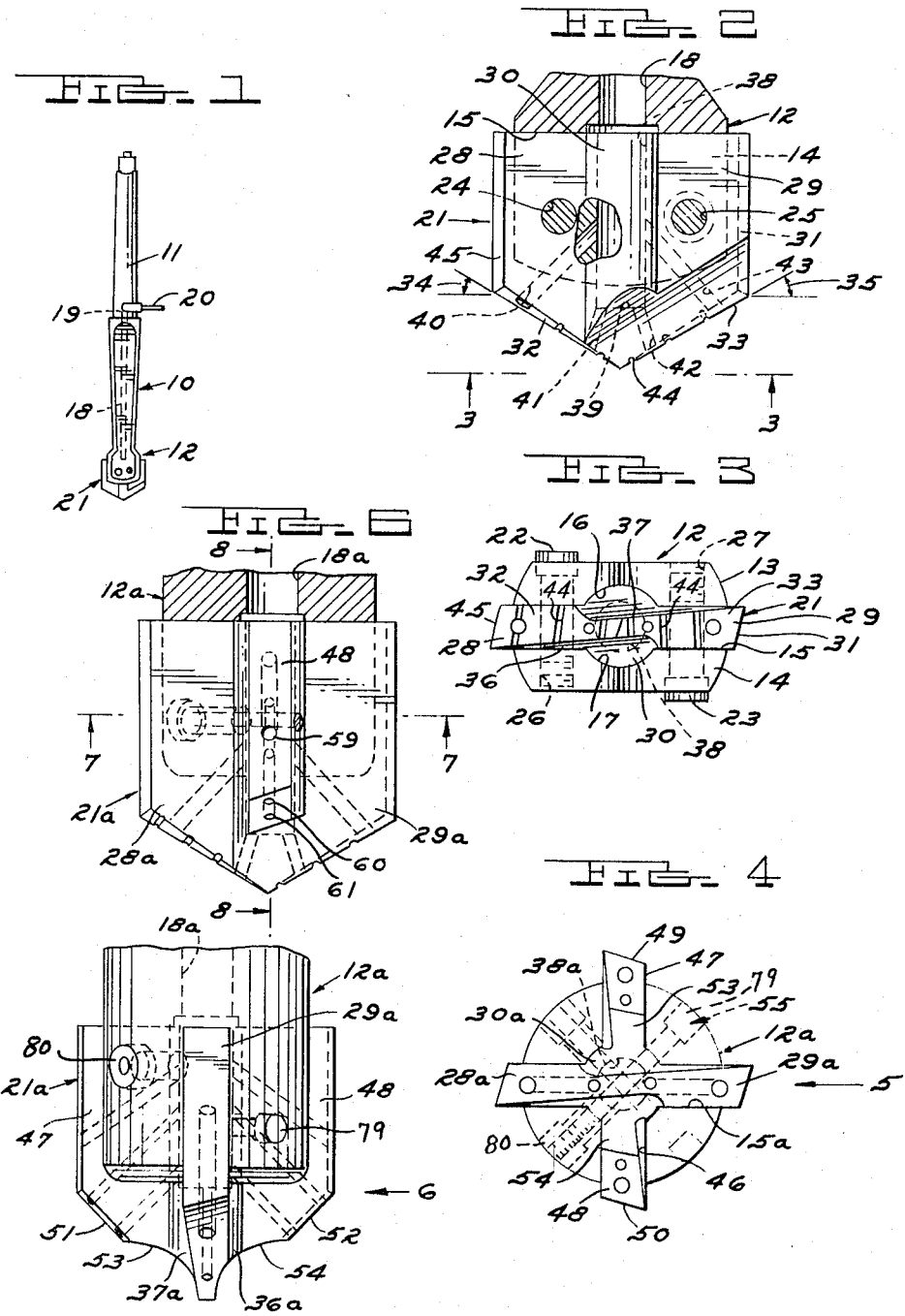
INVENTOR.
JAMES B. SIMMS
BY
Donnelly, Mentag & Harrington
ATTORNEYS Dec. 27, 1966 J. B. SIMMS 3,293,727
CUTTING TOOL
Filed April 12, 1961 2 Sheets-Sheet 2
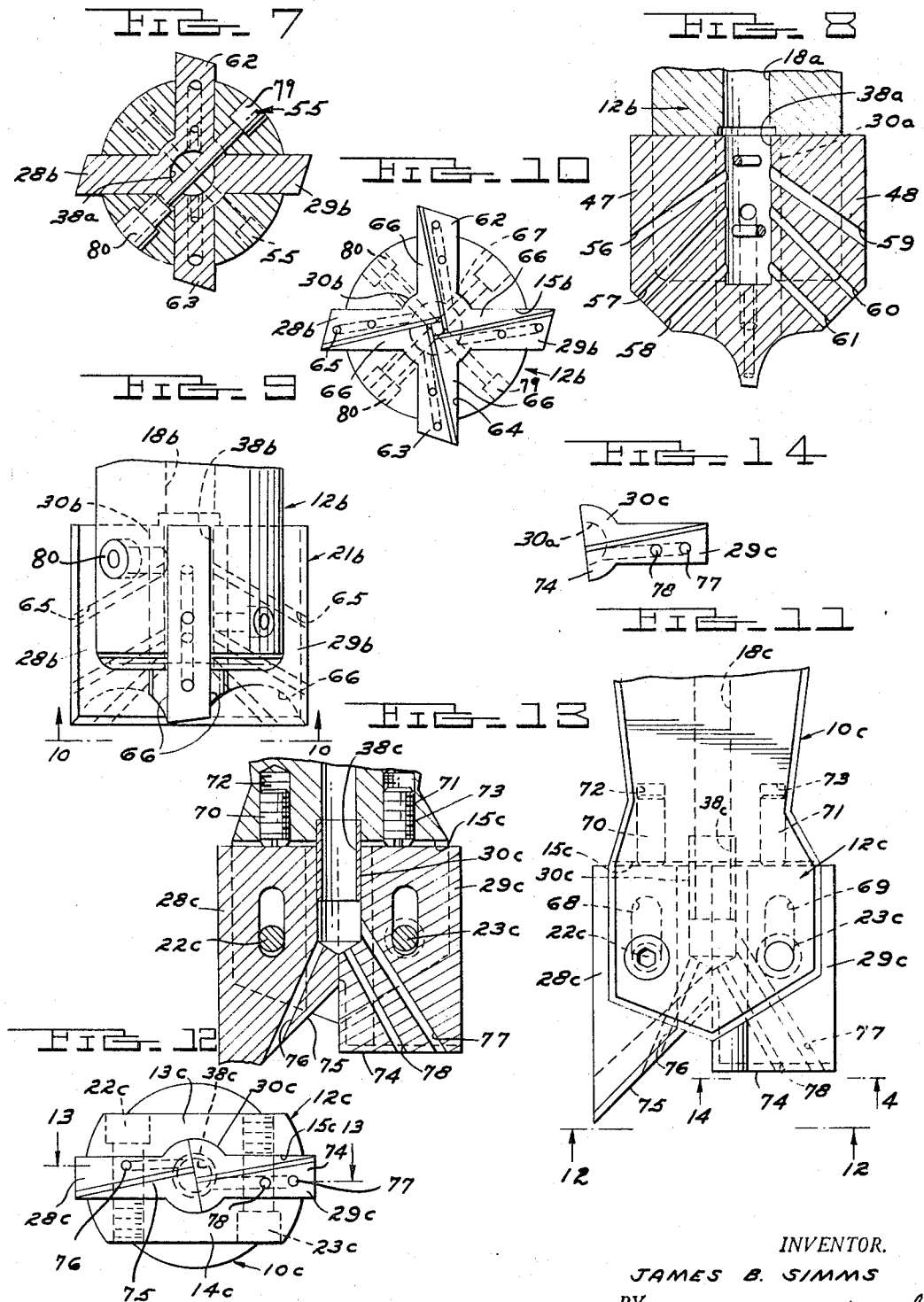
INVENTOR.
JAMES B. SIMMS
BY
Donnelly, Mentag & Harrington
ATTORNEYS

United States Patent Office 3,293,727
Patented Dec. 27, 1966

3,293,727
CUTTING TOOL
James B. Simms, Taylor, Mich., assignor to Bilt Rite Tool & Machine Co., Roseville, Mich., a corporation of Michigan
Filed Apr. 12, 1961, Ser. No. 102,498
5 Claims. (Cl. 29—106)

This invention relates generally to improvements in the cutting tool art, and more particularly to a novel and improved cutting tool construction which may be incorporated in various types of metal cutting tools.

It is a primary object of the present invention to provide a novel and improved cutting tool tip which is provided with a centrally disposed rib having a passage formed therethrough for conveying a coolant under pressure from a suitable source, and wherein the tip is provided with a plurality of coolant passages connected with the central rib passage and adapted to terminate adjacent the cutting edges of the tool tip so that the coolant under pressure may be forced against a workpiece adjacent the cutting edges to cool the workpiece and the cutting tip and force the chips from the cutting area. The central rib of the cutting tip also functions as a chip breaker as well as a cooling center for the tip. The cutting tips of the tool are provided with chip breakers for shredding the chips as they are formed.

It is another object of the present invention to provide a novel and improved cutting tool which stays cooler in operation than the prior art cutting tools and which provides a faster cutting action and a longer life than the similar prior art tools.

It is still another object of the present invention to provide a novel and improved drill cutting tip which is provided with a plurality of cooling passages therethrough, and which is simple and compact in construction, economical of manufacture, and efficient in operation.

It is still another object of the present invention to provide a novel and improved cutting tool tip which may be incorporated in various types of cutting tools, and which is capable of withstanding severe usage.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is an elevational view of a drilling tool provided with a drill tip made in accordance with the principles of the invention;

FIG. 2 is an enlarged plan view of the drill tip illustrated in FIG. 1, and made in accordance with the principles of the invention;

FIG. 3 is an end elevational view of the structure illustrated in FIG. 2, taken along the line 3—3 thereof and looking in the direction of the arrows;

FIG. 4 is an end elevational view of a reamer tip embodying the principles of the present invention;

FIG. 5 is a side elevational view of the reamer tip structure illustrated in FIG. 4, taken in the direction of the arrow marked "5";

FIG. 6 is a side elevational view of the reamer tip structure illustrated in FIG. 5, taken in the direction of the arrow marked "6";

FIG. 7 is a horizontal sectional view of the structure illustrated in FIG. 6, taken along the line 7—7 thereof and looking in the direction of the arrows;

FIG. 8 is an elevational sectional view of the structure illustrated in FIG. 6, taken along the line 8—8 thereof and looking in the direction of the arrows;

FIG. 9 is a side elevational view of a shell milling tool tip made in accordance with the principles of the present invention;

FIG. 10 is an end elevational view of the structure illustrated in FIG. 9, taken along the line 10—10 thereof and looking in the direction of the arrows;

FIG. 11 is a side elevational view of a screw machine cutting tool tip embodying the principles of the invention;

FIG. 12 is an end elevational view of the structure illustrated in FIG. 11, taken along the line 12—12 thereof and looking in the direction of the arrows;

FIG. 13 is an elevational sectional view of the structure illustrated in FIG. 12, taken along the line 13—13 thereof and looking in the direction of the arrows; and, FIG. 14 is an end elevational view of one of the cutting tip sections of the structure illustrated in FIG. 11, taken along the line 14—14 thereof and looking in the direction of the arrows.

Referring now to the drawings, and in particular to FIGS. 1, 2 and 3, wherein is shown an illustrative embodiment in the form of an improved drill, the numeral 10 generally indicates the body of the tool which is provided with the integral tapered supporting shank 11 at the rear end thereof. The front end of the drill body 10 is provided with an integral bifurcated blade or cutter supporting head generally indicated by the numeral 12. As best seen in FIG. 3, the tool head 12 includes the spaced apart portions 13 and 14. The slot 15 between the head portions 13 and 14 forms a cutting tip receiving slot. As shown in FIG. 3, the head portion 13 is provided with a longitudinally extended arcuate recess 16 on the inner side thereof which is disposed opposite to a similar arcuate recess 17 formed on the inner surface of the head portion 14. As shown in FIGS. 1 and 2, the recesses 16 and 17 in the head 12 communicate at the inner end thereof with the coolant passage 18 which is formed in the tool body 10 and which extends longitudinally and rearwardly in the tool to the point 19 as shown in FIG. 1. A suitable flexible coolant feed conduit 20 is adapted to be connected to the tool body 10 and communicate with the rear end 19 of the coolant passage 18.

The numeral 21 designates generally a cutting tool tip made in accordance with the principles of the invention, and which is adapted to be inserted within the bifurcation of and firmly detachably secured to the head 12 by means of the machine screws 22 and 23. As shown in FIGS. 2 and 3, the machine screws 22 and 23 extend through the head portions 13 and 14, respectively, and through suitable holes as 24 and 25 formed in the cutting tip 21 and thence into threadable engagement in the threaded holes 26 and 27 in the oppositely disposed head portions 14 and 13, respectively.

The cutting blade or tip 21 is preferably formed of tool steel or other suitable like material. The double cutting blade 21 is subdivided into the two main blade portions 28 and 29 by means of the centrally disposed longitudinally extended cylindrical rib 30. As shown in FIG. 3, the cylindrical rib 30 is adapted to be seated in the arcuate recesses 16 and 17 formed in the head portions 13 and 14. The rear ends of the blade portions 28 and 29 are formed perpendicular to the longitudinal axis of the cutting blade and are adapted to be seated against the inner end of the slot 15 as shown in FIG. 2. The side edges of the blade portions 28 and 29 are provided with a clearance rake as indicated by the numerals 45 and 31, respectively. The tool 21 has the two outwardly directed cutting edges 32 and 33 at the extreme forward ends of the blade portions 28 and 29, and these cutting edges are provided wtih a positive back rake as indicated by the numerals 34 and 35, respectively. The leading edges of the blade portions 28 and 29 are circle ground as indicated by the numerals 36 and 37.

The cutting blade 21 is provided with an axially inwardly extended coolant passage 38 as shown in FIGS. 2 and 3, and this passage extends forwardly to the point 39 adjacent the forward end of the drill tip. As shown in FIGS. 2 and 3, the sloping drill tip 21 is provided with a plurality of forwardly extended sloping passages as 40, 41, 42 and 43 which communicate at the rear end thereof with the rib passage 38 and at the front end thereof with the atmosphere. It will be seen that the last mentioned passages subdivide the cutting tip into a plurality of cooled portions whereby the cutting tool will be quickly cooled during a cutting action to prevent the development of heat. It will also be seen that the cross-sectional areas of the discharge ports or ends of the passages 41 and 42 adjacent the leading end of the bevel on the cutting edges 32 and 33, respectively, are less than the cross-sectional areas of the discharge ports or ends of the passages 40 and 43 at the trailing end of the bevel. It will be seen that the blade portions 28 and 29 extend outwardly sideward from the rib portion 30 and that the rib portion 30 extends upwardly and downwardly above and below the surfaces of the blade portions. It has been found that if the diameter of the coolant passage 38 of the rib 30 is maintained at least equal to the thickness of the dimension of the blade portions 28 and 29, the cutting tip 21 may function for long cutting periods without heating up and it may be touched by the hand of an operator after extensive cutting without burning the operator. It has been found that a cutting tip made in accordance with the principles of the present invention may be used in continuous duty without heating up above room temperature. The rib 30 further functions to break up the chips. The cutting tip 21 is preferably provided with the chip breaking notches 44 as shown in FIGS. 2 and 3. The rib 30 also functions to center the tool 21 in the tool head 12.

A second embodiment of the invention is illustrated in FIGS. 4 through 8, and comprises a reaming tool provided with a reamer tip embodying the principles of the invention. The parts of the second embodiment which are similar to the parts of the first embodiment have been marked with corresponding reference numerals followed by the small letter "a." In this embodiment the tool blade 12a is round and is provided with a second blade receiving slot 46 which is formed at right angles to the slot 15a and in which is received the reamer teeth or blades 47 and 48. The blades 47 and 48 are formed integral with the rib 30a and extend outwardly therefrom at right angles to the blades 28a and 29a. As shown in FIG. 4, the reaming blades 47 and 48 are provided with clearance angles along the sides thereof as indicated by the numerals 49 and 50. The blades 47 and 48 are provided with cutting edges 51 and 52 along the front ends thereof, and these cutting edges terminate at a point spaced outwardly from the blades 28a and 29a. The inner forward edges of the blades 47 and 48 are circle ground as indicated by the numerals 53 and 54.

The reamer tip 21a is held in place in the head 12a by the means of the machine screws 55. As shown in FIG. 8, the reaming blades 47 and 48 are provided with a plurality of coolant passages as 56, 57, 58, 59, 60 and 61 which terminate at their outer ends along the side and cutting edges of the blades, and at their inner ends with the coolant passage 38a formed in the longitudinal rib 30a.

FIGS. 9 and 10 illustrate a third embodiment of the invention which comprises a shell milling tool provided with a cutting tip made in accordance with the principles of the present invention. The parts of the third embodiment which are similar to the parts of the first embodiment are marked with corresponding reference numerals followed by the small letter "b." In this embodiment the blade holding head 12b is round and is similar to the head 12a. As shown in FIG. 10, the head 12b is provided with the transverse blade slot 15b in which is disposed the cutter blade portions 28b and 29b that are carried by the rib portion 30b. The cutting blade portions 28b and 29b are formed in the same manner as the cutting blade portions 28 and 29 of the embodiment of FIG. 1 with the exception that the forward cutting edges of these blade portions are disposed perpendicularly or transversely to the longitudinal axis of the cutter tip. A similar pair of cutting blade portions 62 and 63 are integrally connected to the longitudinal rib 30b and are disposed in the slot 64 in the head 12b, and the slot 64 is formed at right angles to the slot 15b. As shown in FIGS. 9 and 10, each of the blade portions 28b, 29b, 62 and 63 are provided with a plurality of outwardly sloping cooling passages as 65 which communicate at the inner end thereof with the cooling passage 38b in the longitudinal rib 30b, and at the outer end with the atmosphere along the blade edges. The forward cutting edges of the blade portions 62 and 63 are also formed transversely or perpendicular to the longitudinal axis of the cutting tip. The cutting edges of the milling tip 21b are all circle ground as indicated by the numeral 66. The milling cutter tip 21b is held in place on the head 12b by any suitable means as by the machine screws 67.

FIGS. 11 through 14 disclose a fourth embodiment of the invention which comprises a screw machine tool having cutter tips made in accordance with the principle of the present invention. The parts of this fourth embodiment which are similar to the parts of the first embodiment are marked with corresponding reference numerals followed by the small letter "c." As shown in FIGS. 11 through 14, the screw machine tool comprises the body 10c having the integral head 12c formed on the forward end thereof. The cutting tip is formed with the two separately formed blade portions 28c and 29c, and integrally formed on the inner side thereof is a half portion of the longitudinal rib member 30c. The blade portions 28c and 29c are detachably secured in the slot 15c between the head portions 13c and 14c, by any suitable means as by means of the machine screws 22c and 23c. The cutter blade portions 28c and 29c are provided with the slots 68 and 69 to permit inward and outward lengthwise adjustment of the cutter blade portions relative to the head 12c. As shown in FIG. 13, a pair of adjustably mounted Allen screws or the like as 70 and 71 are threadably mounted in the longitudinally disposed spaced apart threaded holes 72 and 73 for engagement by the rear ends of the cutter blade portions 28c and 29c. The Allen screws 70 and 71 may be set to any adjusted depth in the holes 72 and 73 for adjusting the blade portions 28c and 29c to the desired cutting positions. As shown in FIGS. 11 and 13, the forward cutting edge 74 of the blade 29c is formed transversely or perpendicularly to the longitudinal axis of the cutting tool so as to provide an end facing tool for squaring diameter purposes and the like. The cutting blade portion 28c is provided with an outwardly and forwardly sloping cutting edge 75 for chamfering or for multi-diameter cutting purposes. The cutter blade portion 28c is provided with the coolant passage 76 which terminates at the outer end thereof along the cutting edge 75 and at the inner end thereof with the coolant chamber 38c and the rib 30c. The cutting blade portion 29c is also provided with similar outwardly sloping coolant passages as 77 and 78.

Experience has shown that cutting tools provided with cutting tips made in accordance with the present invention are capable of faster cutting action under long life conditions and at very low temperatures. Drilling tools made in accordance with the embodiment of FIG. 1 provide a true round straight hole in one fast pass through the workpiece, and it can be used with efficiency and a minimum of training by unskilled operators. It has been found that the cutting speed may be increased when tools made in accordance with the present invention are used without losing quality in regards to the size, finishes or tolerances. The coolant chamber in the cutting tips of the present invention provides a cooling center for the tool tip and the various coolant passages through the blade portion provide for efficient cooling of the cutting tip and the workpiece at the cutting contact point between it and the cutting tip. The longitudinal rib 30 functions to crunch the threaded chips made by the cutting action, and the pressure of the coolant being discharged from the passages in the blade portions cool and extrude the chips from the cutting area. Suitable coolants adapted for use in the tools of the present invention are ice cold air, Soluble oil, and coolants sold on the market under the trade names Mistic Mist and Simco. The tools and tips of the present invention may be made in any desired sizes.

It will be seen that each of the screws 55 comprises the male portion 79 which is threadably mounted into the female portion 80. The rib 30 extends up to the circle ground radius of the cutting edges. The coolant passages as 56 through 61 have a diameter of at least one-quarter the thickness of the blades for optimum cooling of the tool. The diameter of the interior of the rib or the passage 38 is always larger than the thickness of the blades as 28 and 29. The wall thickness of the rib 30 is at least one-sixteenth of an inch.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A cutting tool comprising: a body; a shank formed on one end of said body for mounting the tool in a support for a cutting operation; a head on the other end of said body; a cutting tip releasably secured in said head; said cutting tip having a plurality of outwardly extended blade portions having cutting edges on the forward ends thereof; said cutting tip having an axial longitudinally disposed rib which projects outwardly beyond the sides of said blade portions; a passage formed through said tool and terminating at said cutting tip in said head for conducting a coolant to said cutting tip; said rib having a coolant chamber formed therein for the reception of pressurized coolant from the passage in said tool; and a plurality of laterally spaced apart, forwardly outward divergent fluid passages formed in said blade portions for conducting coolant from the chamber in said rib and into engagement with a workpiece being cut and the tool at the cutting area for cooling the same and for carrying away chips from the work area.

2. A cutting tool as defined in claim 1, wherein: said plurality of outwardly extended blade portions includes a first pair of coplaner blade portions and a second pair of reaming blade portions; and, said reaming blade portions being coplaner and disposed in a plane perpendicular to the plane of said first named blade portions.

3. A cutting tool as defined in claim 1, wherein: said plurality of blade portions includes a first blade portion having a cutting edge on the forward end thereof and having a first part of said longitudinally disposed rib formed along the inner side thereof; and, a second blade portion having a sloping cutting edge on the forward end thereof and having the other part of the longitudinally disposed rib formed along the inner side thereof for mating engagement with the longitudinally disposed rib part on the first named blade portion.

4. A cutting tool for use with a mist cooling system, comprising a drill body, said drill body having at least one cutting edge defining a bevel, said body being formed with a plurality of internal passages, said passages terminating at one end in discharge ports spaced along said bevel in proximity to said cutting edge and at another end in inlet ports located at a distance from said discharge ports, the cross-sectional area of the discharge port adjacent the leading end of said bevel being less than the cross-sectional area of the discharge port at the trailing end of said bevel, said passages being adapted to deliver a flow of cooled mist to said cutting edge.

5. A cutting tool comprising: a body; a shank formed on one end of said body for mounting the tool in a support for a cutting operation; a head on the other end of said body; a cutting tip releasably secured in said head; said cutting tip having a plurality of outwardly extended blade portions having cutting edges on the forward ends thereof; said cutting tip having an axial longitudinal disposed rib which projects outwardly beyond the sides of said blade portions; a passage formed through said tool and terminating at said cutting tip in said head for conducting a coolant to said cutting tip; said rib having a coolant chamber formed therein for the reception of pressurized coolant from the passage in said tool; a plurality of laterally spaced apart, forwardly divergent fluid passages formed in said blade portions for conducting coolant from the chamber in said rib and into engagement with a workpiece being cut and the tool at the cutting area for cooling the same and for carrying away chips from the work area; said plurality of outwardly extended blade portions including a first pair of coplaner end mill blade portions and a second pair of coplaner end mill blade portions; and, said pairs of end mill blade portions being disposed on planes perpendicular to each other.

References Cited by the Examiner

UNITED STATES PATENTS

| | | | |
|---|---|---|---|
| 552,065 | 12/1895 | King | 77—68 |
| 582,081 | 5/1897 | Newton | 29—106 X |
| 960,526 | 6/1910 | Erlandsen | 29—106 X |
| 1,554,452 | 5/1923 | Moore | 77—68 |
| 1,746,716 | 2/1930 | Sasse | 77—65 |
| 2,237,901 | 4/1941 | Newton | 29—106 X |

FOREIGN PATENTS

| | | |
|---|---|---|
| 810,543 | 3/1959 | Great Britain. |
| 143,692 | 1/1954 | Sweden. |

FRANCIS S. HUSAR, *Primary Examiner.*

J. SPENCER OVERHOLSER, *Examiner.*

H. L. HINSON, *Assistant Examiner.*